(12) United States Patent
Waas et al.

(10) Patent No.: US 10,024,301 B2
(45) Date of Patent: Jul. 17, 2018

(54) TEXTILE COMPOSITE WIND TURBINE BLADE

(71) Applicant: THE REGENTS OF THE UNIVERSITY OF MICHIGAN, Ann Arbor, MI (US)

(72) Inventors: Anthony Waas, Ann Arbor, MI (US); Yuan Lin Kevin Lim, Singapore (SG); Chongyu Brian Wang, Singapore (SG)

(73) Assignee: The Regents of The University of Michigan, Ann Arbor, MI (US)

( * ) Notice: Subject to any disclaimer, the term of this patent is extended or adjusted under 35 U.S.C. 154(b) by 1542 days.

(21) Appl. No.: 13/659,601

(22) Filed: Oct. 24, 2012

(65) Prior Publication Data

US 2013/0101430 A1 Apr. 25, 2013

Related U.S. Application Data

(60) Provisional application No. 61/550,793, filed on Oct. 24, 2011.

(51) Int. Cl.
| | |
|---|---|
| *F03D 1/06* | (2006.01) |
| *B29C 70/22* | (2006.01) |
| *B29C 63/00* | (2006.01) |
| *B29L 31/08* | (2006.01) |

(52) U.S. Cl.
CPC .......... *F03D 1/0683* (2013.01); *B29C 70/222* (2013.01); *B29C 63/0021* (2013.01); *B29L 2031/085* (2013.01); *F05B 2240/301* (2013.01); *F05B 2280/6002* (2013.01); *F05B 2280/6003* (2013.01); *F05B 2280/6013* (2013.01); *Y02E 10/721* (2013.01); *Y02P 70/523* (2015.11)

(58) Field of Classification Search
CPC ... F03D 1/0683; F03D 1/0675; B29C 70/222; B29C 70/24; B29C 63/0021; B29L 2031/085

See application file for complete search history.

(56) References Cited

U.S. PATENT DOCUMENTS

| | | | | |
|---|---|---|---|---|
| 4,885,973 | A * | 12/1989 | Spain | ...................... D04C 1/02 156/148 |
| 5,001,961 | A * | 3/1991 | Spain | ...................... B22F 3/002 428/542.8 |
| 7,147,895 | B2 * | 12/2006 | Cundiff | ................. B29C 70/083 264/138 |
| 7,364,407 | B2 * | 4/2008 | Grabau | ................... F03D 1/065 416/229 R |

(Continued)

OTHER PUBLICATIONS

Stuart M. Lee, "Handbook of Composite Reinforcements", Nov. 30, 1992, John Wiley & Sons, pp. 56.*

(Continued)

*Primary Examiner* — Igor Kershteyn
*Assistant Examiner* — Brian P Wolcott
(74) *Attorney, Agent, or Firm* — Harness, Dickey & Pierce, P.L.C.

(57) ABSTRACT

A wind turbine blade includes at least one mandrel and a sock that covers the at least one mandrel. The sock includes a plurality of braided fibers within a matrix material. The fibers can be made of different materials. Also, stiffness of the sock can vary across the wind turbine blade. A method of manufacturing the wind turbine blade is also disclosed.

11 Claims, 2 Drawing Sheets

(56) References Cited

U.S. PATENT DOCUMENTS 7,963,747 B2 6/2011 Cairo
2011/0211971 A1* 9/2011 Bendel .................. F03D 1/0675
416/241 R

OTHER PUBLICATIONS

"World Wind Energy Report 2009", World Wind Energy Association, Mar. 2010.
"Norwegian Company Develops World's Largest Wind Turbine," Alternative Energy News, Oct. 2010.
"Summary of Wind Turbine Accident Data to Sep. 30, 2010," Caithness Windfarm Information Forum, www.caithnesswindfarms.co.uk, Sep. 2010.
"Executive Summary," Wind Energy—The Facts, Mar. 2009.

* cited by examiner

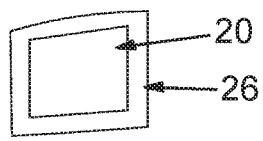
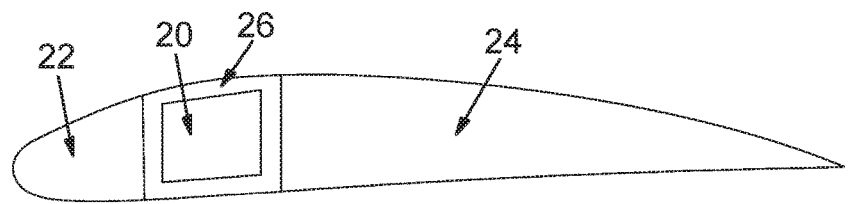
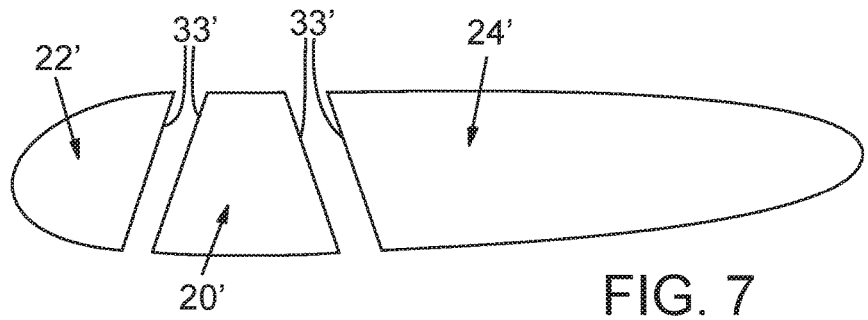
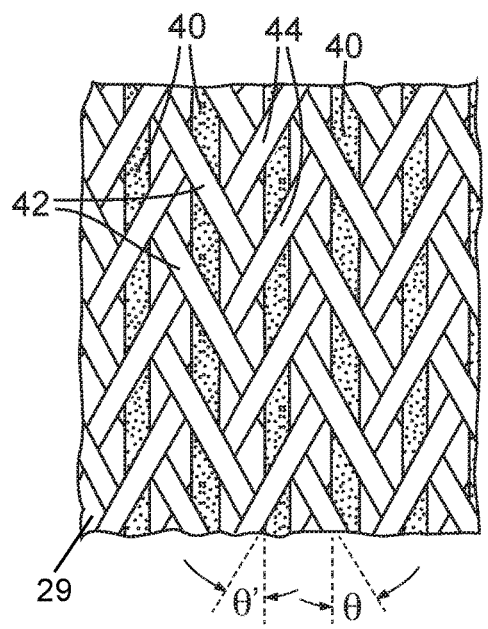
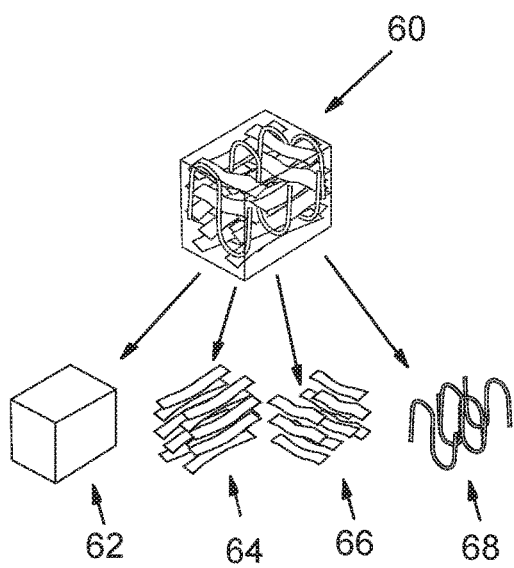

TEXTILE COMPOSITE WIND TURBINE BLADE

This application claims the benefit of U.S. Provisional Application No. 61/550,793, filed on Oct. 24, 2011. The entire disclosure of the above application is incorporated herein by reference.

FIELD

The present disclosure relates to a wind turbine blade and, more particularly, to a textile composite wind turbine blade and methods of manufacturing the same.

BACKGROUND

This section provides background information related to the present disclosure which is not necessarily prior art.

Generating power from wind energy has increased within the last several decades. Typically, a plurality of wind turbine blades are attached to a common hub, and the blades extend radially therefrom. The hub is operably connected to a power generator. Wind pushes and rotates the wind turbine blades to rotate the hub, which in turn drives the power generator to generate electricity.

It can be desirable to increase the size (e.g., radial length) of the wind turbine blades to thereby increase the amount of electricity produced. However, increasing the size of the blades can present design, engineering, manufacturing, and logistical problems, and structural integrity of the blades may suffer as a result.

SUMMARY

This section provides a general summary of the disclosure, and is not a comprehensive disclosure of its full scope or all of its features.

A wind turbine blade is disclosed that includes at least one mandrel and a sock that covers the at least one mandrel. The sock includes a plurality of braided fibers within a matrix material. A stiffness of the sock varies across the wind turbine blade.

A wind turbine blade is also disclosed that includes at least one mandrel and a sock that covers the at least one mandrel. The sock includes a plurality of zero degree fibers and a plurality of bias angle fibers that are disposed at a bias angle relative to the zero degree fibers. The plurality of zero degree fibers are each made of a first material and the plurality of bias angle fibers are made of a second material. The first and second materials are different from each other.

Additionally, a method of manufacturing a wind turbine blade is disclosed. The method includes providing a plurality of mandrels and covering at least one of the mandrels with a first sock. The first sock includes a plurality of braided fibers. The method also includes covering the at least one of the mandrels, the first sock, and another of the plurality of mandrels with a second sock. The second sock includes a plurality of braided fibers. The method additionally includes introducing a matrix material to the first sock and the second sock after covering the at least one of the mandrels, the first sock, and the other of the plurality of mandrels with the second sock.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a sectional view of a box beam of the wind turbine blade;

FIG. 6 is a sectional view of portions of the wind turbine blade of FIG. 1;

FIG. 7 is a sectional view of portions of the wind turbine blade according to additional exemplary embodiments;

FIG. 8 is a detail view of a two dimensional triaxial braided composite material that can be used for constructed a sock of the wind turbine blade of FIG. 1; and FIG. 9 is a schematic perspective view of a three dimensional textile composite that can be used for constructing the wind turbine blade of FIG. 1.

Corresponding reference numerals indicate corresponding parts throughout the several views of the drawings.

DETAILED DESCRIPTION

Example embodiments will now be described more fully with reference to the accompanying drawings.

Figure 1:
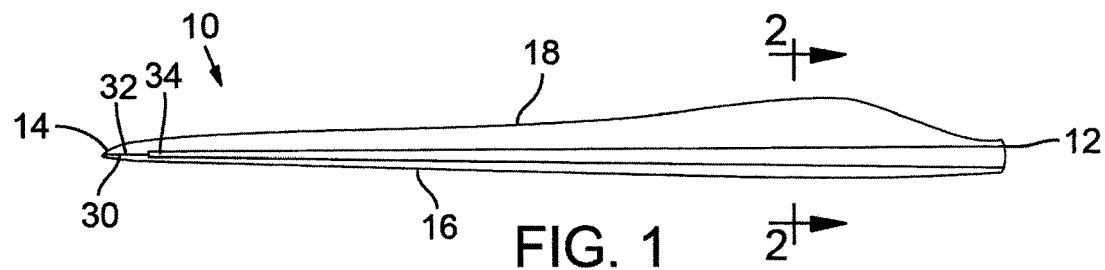
FIG. 1 is a plan view of a wind turbine blade according to various exemplary embodiments of the present disclosure.
Figure 2:
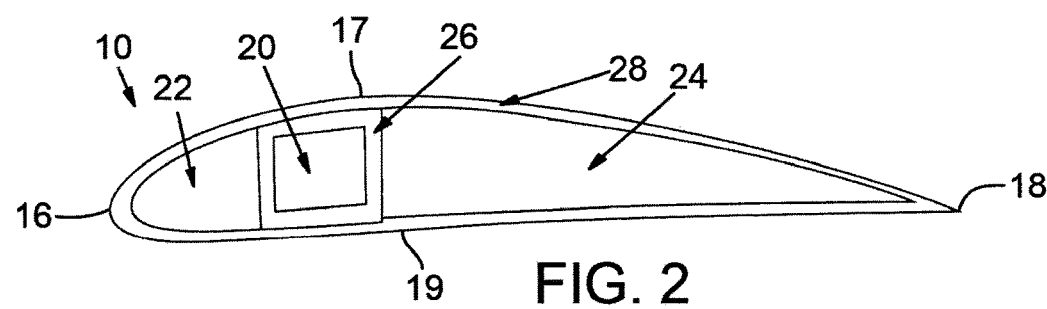
FIG. 2 is a sectional view of the wind turbine blade taken along line 2-2 of FIG. 1.

Referring initially to FIGS. 1 and 2, a wind turbine blade 10 is illustrated according to various exemplary embodiments. The turbine blade 10 can include a hub end 12, a distal end 14 that is opposite the hub end 12, a leading edge 16, and a trailing edge 18 that is opposite the leading edge 16. Moreover, the blade 10 can include a top surface 17 and a bottom surface 19. Those having ordinary skill in the art will understand that the hub end 12 can be operably coupled to a hub (not shown) of a wind turbine (not shown), and the blade 10 can extend radially away from the hub. Additional blades 10 can also be attached to the hub, and the hub can be operably coupled to a generator (not shown). Then, wind can push the blades 10 to rotate the hub so as to drive the power generator for generating power.

As will be explained in detail below, the blade 10 can be longer than those of the prior art, and yet, the blade 10 can be relatively lightweight and relatively strong. As such, the blade 10 can generate power more efficiently than those of the prior art. Moreover, the blade 10 can be manufactured in a relatively efficient manner.

As shown in FIG. 2, the blade 10 can include a plurality of mandrels 20, 22, 24, namely, a box beam mandrel 20, a first outer mandrel 22 (leading edge mandrel), and a second outer mandrel 24 (trailing edge mandrel). The blade 10 can also include a first sock 26 (box beam sock) that covers (surrounds, encapsulates, etc.) the box beam mandrel 20. Moreover, the blade 10 can include a second sock 28 that collectively covers (surrounds, encapsulates, etc.) each of the mandrels 20, 22, 24 as well as the first sock 26.

Figure 3:
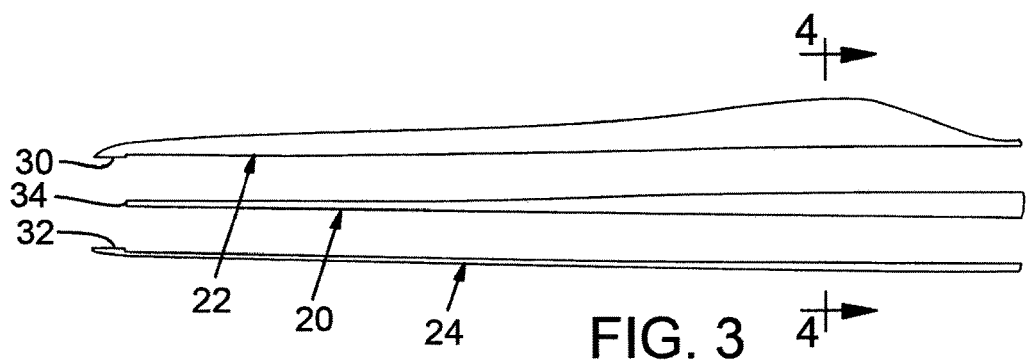
FIG. 3 is a plan view of portions of the wind turbine blade of FIG. 1, shown disassembled.
Figure 4:
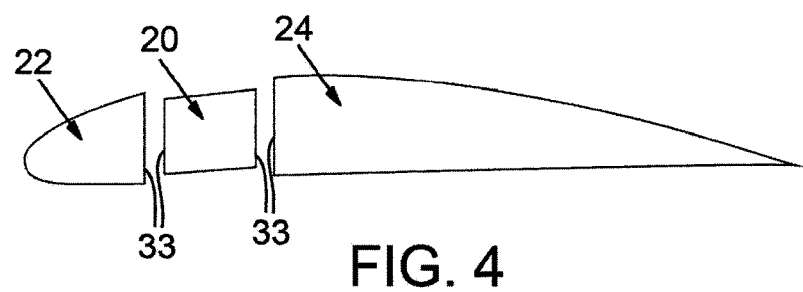
FIG. 4 is a sectional view of the portions of the wind turbine blade taken along the line 3-3 of FIG. 3.

Referring to FIGS. 3 and 4, the mandrels 20, 22, 24 will be discussed in greater detail. The mandrels 20, 22, 24 can be made out of any suitable material, such as foam. The mandrels 20, 22, 24 can be shaped using a CNC router, for example. In some embodiments, the mandrels 20, 22, 24 can each be monolithic bodies that extend continuously between the hub end 12 and the distal end 14 of the blade 10. Also, the mandrels 20, 22, 24 can each extend continuously between the top and bottom surfaces 17, 19 of the blade 10.

As shown in FIG. 3, the first and second outer mandrels 22, 24 can each include a hooked end 30, 32, respectively. The hooked ends 30, 32 can surround an end 34 of the box beam mandrel 20 as shown in FIG. 1. In contrast, each of the mandrels 20, 22, 24 can terminate at a common plane adjacent the hub end 12.

As shown in FIG. 4, internal surfaces 33 of the mandrels 20, 22, 24 can be generally normal to the top and bottom surfaces 17, 19 of the blade 10. However, these internal surfaces 33 could be disposed at an acute or obtuse angle relative to the bottom surfaces 17, 19. For instance, FIG. 7 shows mandrels 20', 22', 24' with internal surfaces 33' disposed at such angles. It will be appreciated, thus, that the mandrels 20, 22, 24, 20', 22', 24' could have any suitable shape. It will also be appreciated that the blade 10 could include any number of mandrels 20, 22, 24, 20', 22', 24'. Moreover, in some embodiments, the blade 10 could include a single mandrel with a single sock covering that mandrel without departing from the scope of the present disclosure.

Referring to FIG. 8, the socks 26, 28 will be discussed in greater detail. The first and second socks 26, 28 can each be made from a composite material. More specifically, the socks 26, 28 can include a plurality of braided fibers 40, 42, 44 embedded within a matrix material 29. As shown in FIG. 8, one or both socks 26, 28 can include two-dimensional triaxial braided composite material having zero degree fibers 40 and bias angle fibers 42, 44. The zero degree fibers 40 can each be substantially parallel with each other, the bias angle fibers 42 can be substantially parallel to each other, and the bias angle fibers 44 can be substantially parallel to each other. Also, the bias angle fibers 42 can be disposed at a positive bias angle ($\theta$) relative to the zero degree fibers 40, and the bias angle fibers 44 can be disposed at a negative bias angle ($\theta'$) relative to the zero degree fibers 40. The positive bias angle $\theta$ can be substantially equal but opposite to the negative bias angle $\theta'$.

Specifically, the bias angles $\theta$, $\theta'$ can be approximately 45 degrees and negative 45 degrees, respectively in some embodiments. In additional embodiments, the bias angles $\theta$, $\theta'$ can be approximately 30 degrees and negative 30 degrees, respectively. In still additional embodiments, the bias angles $\theta$, $\theta'$ can be approximately 60 degrees and negative 60 degrees, respectively. Thus, it will be appreciated that the bias angles $\theta$, $\theta'$ can be of any suitable values.

Also, the matrix material 29 can be disposed between the fibers 40, 42, 44. The matrix material 29 can be of any suitable type known in the art for composites manufacture (e.g., epoxy, etc.).

It will be appreciated that the plan view shown in FIG. 8 can represent a single layer of composite material. The socks 26, 28 can include any suitable number of layers of the type shown in FIG. 8.

In some embodiments, the stiffness of the first sock 26 can vary across the blade 10. Likewise, the stiffness of the second sock 28 can vary across the blade 10. For instance, the first and/or second sock 26, 28 can be stiffer adjacent the hub end 12 than that adjacent the distal end 14, or vice versa. Stated differently, the stiffness can vary in the "span" direction from hub end 12 to the distal end 14. Also, the first and/or second sock 26, 28 can be stiffer adjacent the leading edge 16 than that adjacent the trailing edge 18, or vice versa. Stated differently, the stiffness can vary in the "chord" direction from the leading edge 16 to the trailing edge 18. However, it will be appreciated that the stiffness can vary in any direction along the length, width, or height of the blade 10.

The stiffness can be varied along the blade 10 by varying the bias angle $\theta$, $\theta'$ along the sock(s) 26, 28. For example, the bias angles $\theta$, $\theta'$ can be approximately 15 degrees and negative 15 degrees, respectively, at the hub end 12, while the bias angles $\theta$, $\theta'$ can be approximately 60 degrees and negative 60 degrees, respectively, at the distal end 14. The bias angles $\theta$, $\theta'$ can vary gradually along the length of the sock(s) 26, 28. Also, in some embodiments, there can be distinct zones defined in the sock(s) 26, 28 that have different bias angles $\theta$, $\theta'$ from each other.

Accordingly, the stiffness of the blade 10 can be tailored to have increased stiffness where necessary (e.g., where static or dynamic loading on the blade 10 requires higher stiffness), and yet other portions of the blade 10 can be less stiff. As such, the blade 10 can be made longer than those of the prior art, and yet the blade 10 can be more lightweight and stronger than those of the prior art.

Moreover, in some embodiments, the materials of one or more of the fibers 40, 42, 44 can be different from the others within the same sock 26, 28. For instance, the fibers 40 can each be made of carbon fibers while the other fibers 42, 44 can each be made of glass fibers. Other combinations of materials are also within the scope of the present disclosure. As such, material costs for the blade 10 can be reduced.

To manufacture the blade 10, the mandrels 20, 22, 24 can be individually formed (e.g., from foam on a CNC machine). Then, as shown in FIG. 5, the box beam mandrel 20 can be covered by the braided fibers 40, 42, 44 of the first sock 26. The sock 26 can be formed on the mandrel 20 using known techniques for forming composite skins.

Next, as shown in FIG. 6, the first and second outer mandrels 22, 24 can be abutted against the previously covered box beam 20 such that the box beam 20 and first sock 26 are disposed between the first and second outer mandrels 22, 24. Subsequently, as shown in FIG. 2, the mandrels 20, 22, 24 and the fibers of the first sock 26 can be covered by the braided fibers 40, 42, 44 of the second sock 28. Once covered, the matrix material 29 (e.g., resin) of the first and second socks 26, 28 can be introduced to the fibers 40, 42, 44 of each sock 26, 28. Stated differently, the fibers 40, 42, 44 of the first and second socks 26, 28 can be impregnated with the matrix material 29 only after the fibers 40, 42, 44 of the first sock 26 are wrapped about the box beam mandrel 20 and the fibers 40, 42, 44 of the second sock 28 are wrapped around the mandrels 20, 22, 24 and the first sock 26. The matrix material 29 can be introduced by vacuum assisted resin transfer. Finally, the matrix material 29 can be cured according to known methods.

FIG. 9 shows exemplary views of a three dimensional (3D) textile composite 60 that can be used to form one or both of the socks 26, 28. As shown, there can be weft fibers 64 that extend in one direction and warp fibers 66 that extend in a second direction (e.g., substantially perpendicular to the weft fibers 64). The weft and warp fibers 64, 66 can be arranged side-by-side and also layered over each other in alternating layers. Also, there can be Z-fibers 68 that extend up and down through the layers and partially along the second direction (i.e., parallel to the warp fibers 66). Moreover, the fibers 64, 66, 68 can be embedded within a matrix material 62. The materials of the fibers 64, 66, 68 and/or the matrix material 62 can be of the same materials discussed above, or they can be made out of different materials. Thus, when used to form one or both socks 26, 28, the 3D textile composites can provide relatively high strength to weight ratio, per unit cost. Also, the 3D composites can reduce occurrences of delamination on the wind turbine blade. Furthermore, these composites can provide a cost advantage because they can be produced in a large scale, leading to a cost structure that favors mass production.

It will be appreciated that the stiffness of the blade 10 can vary across the blade 10 as discussed above, even if the 3D composite materials exemplified in FIG. 9 are used. Also, the materials of the blade 10 could vary across the blade, wherein only some portions of the blade 10 include 3D composite materials.

As mentioned above, the two-dimensional or three-dimensional composite materials can be layered with a plurality of plies to form one or both socks 26, 28. In some embodiments, there can be at least eight plies used to form the sock(s) 26, 28. Also, in some embodiments, the number of plies on certain areas of the sock 26, 28 can be different from other areas of the respective sock to thereby vary the stiffness of the blade 10. Moreover, as shown in FIG. 10, the cross sectional dimensions of the bias tow can be different from the cross sectional dimensions of the axial tow. As such, the stiffness of the blade 10 can be tailored as discussed above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A blade comprising:
   a first mandrel;
   a second mandrel;
   a first braided fiber sock encapsulating the first mandrel, the first braided fiber sock including a plurality of braided fibers within a matrix material arranged as both weft and warp fibers;
   a second braided fiber sock collectively encapsulating the first mandrel, the first braided fiber sock, and the second mandrel, the second braided fiber sock including a plurality of braided fibers within a matrix material arranged as both weft and warp fibers,
   a stiffness of at least one of the first braided fiber sock and the second braided fiber sock varying across the blade, the plurality of braided fibers of the first braided fiber sock having a first bias angle, the plurality of braided fibers of the second braided fiber sock having a second bias angle, the first bias angle and the second bias angle changing across the blade such that the stiffness varies across the blade, at least one of the plurality of braided fibers of the first braided fiber sock being made of a material that is different from another one of the plurality of braided fibers of the first braided fiber sock, at least one of the plurality of braided fibers of the second braided fiber sock being made of a material that is different from another one of the plurality of braided fibers of the second braided fiber sock; and
   a Z-fiber braided in at least one of the first braided fiber sock and the second braided fiber sock, the Z-fiber being arranged in a Z-direction relative to the weft and warp fibers to form a three-dimensional composite.

2. The blade of claim 1, wherein the blade includes a hub end and a distal end, the hub end operable to be adjacent a rotatable and a distal end that is opposite the hub end, the blade defining a span direction from the hub end to the distal end, the stiffness of at least one of the first braided fiber sock and the second braided fiber sock varying along the span direction.

3. The blade of claim 2, wherein the stiffness of at least one of the first braided fiber sock and the second braided fiber sock reduces from the hub end to the distal end.

4. The blade of claim 1, wherein the blade includes a leading edge and a trailing edge, the blade operable to be rotated whereupon the leading edge leads the trailing edge, a chord direction defined between the leading edge and the trailing edge, the stiffness of at least one of the first braided fiber sock and the second braided fiber sock varying along the chord direction.

5. The blade of claim 1, further comprising:
   a box beam mandrel being disposed between the first and second mandrels, the second braided fiber sock encapsulating the box beam mandrel, the first mandrel, the first braided fiber sock, and the second mandrel.

6. The blade of claim 1, wherein the plurality of braided fibers of at least one of the first braided fiber sock and the second braided fiber sock include a plurality of zero degree fibers and a plurality of bias angle fibers that are disposed at a bias angle relative to the zero degree fibers, the plurality of zero degree fibers each made of a first material and the plurality of bias angle fibers made of a second material, the first and second materials being different from each other.

7. A method of manufacturing a blade comprising:
   providing a plurality of mandrels;
   encapsulating at least one of the mandrels with a first braided fiber sock, the first braided fiber sock including a plurality of braided fibers being arranged with weft fibers, warp fibers, and Z-fibers arranged in a Z-direction relative to the weft and warp fibers to form a three-dimensional composite, a bias angle of at least one of the weft fibers and the warp fibers varying across the blade;
   introducing a matrix material to the first braided fiber sock and curing the matrix material;
   collectively encapsulating the at least one of the mandrels, the first braided fiber sock, and another of the plurality of mandrels with a second braided fiber sock, the second braided fiber sock including a plurality of braided fibers being arranged with weft fibers, warp fibers, and Z-fibers arranged in a Z-direction relative to the weft and warp fibers to form a three-dimensional composite, a bias angle of at least one of the weft fibers and the warp fibers varying across the blade; and
   introducing a matrix material to the second braided fiber sock after encapsulating the at least one of the mandrels, the first braided fiber sock, and the other of the plurality of mandrels with the second braided fiber sock.

8. The method of claim 7, wherein introducing the matrix material includes vacuum assisted resin transfer.

9. The method of claim 7, further comprising curing the matrix material.

10. The method of claim 7, further comprising braiding at least one of the first braided fiber sock and the second braided fiber sock to include a plurality of fibers, at least two of the plurality of fibers being made of different materials.

11. The blade of claim 1 wherein the first bias angle is different than the second bias angle.

* * * * *